Jan. 10, 1939.   N. S. LINCOLN   2,143,446
CONTROLLING MECHANISM FOR AUTOMOBILE TRANSMISSIONS
Filed Feb. 23, 1937   4 Sheets-Sheet 3

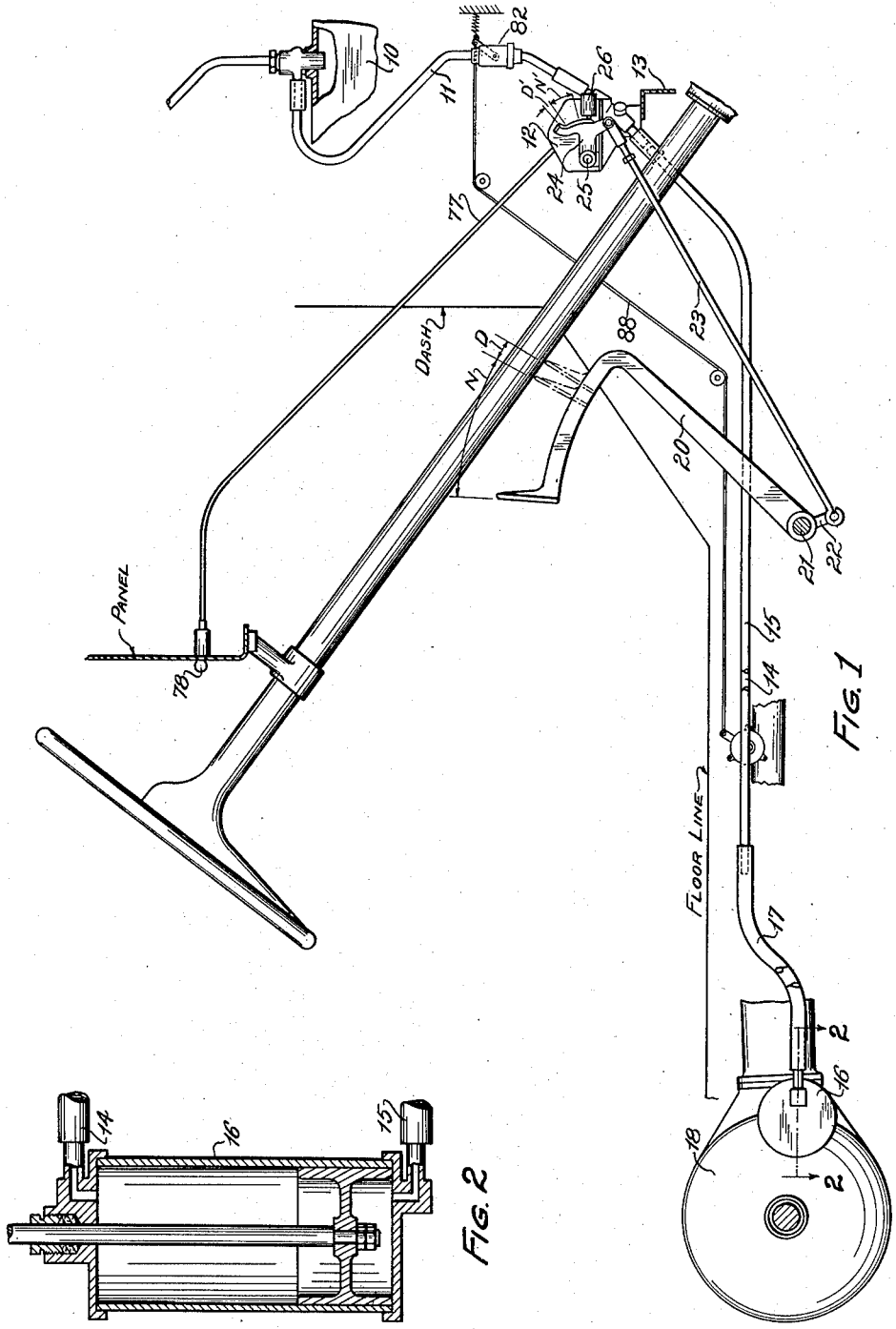

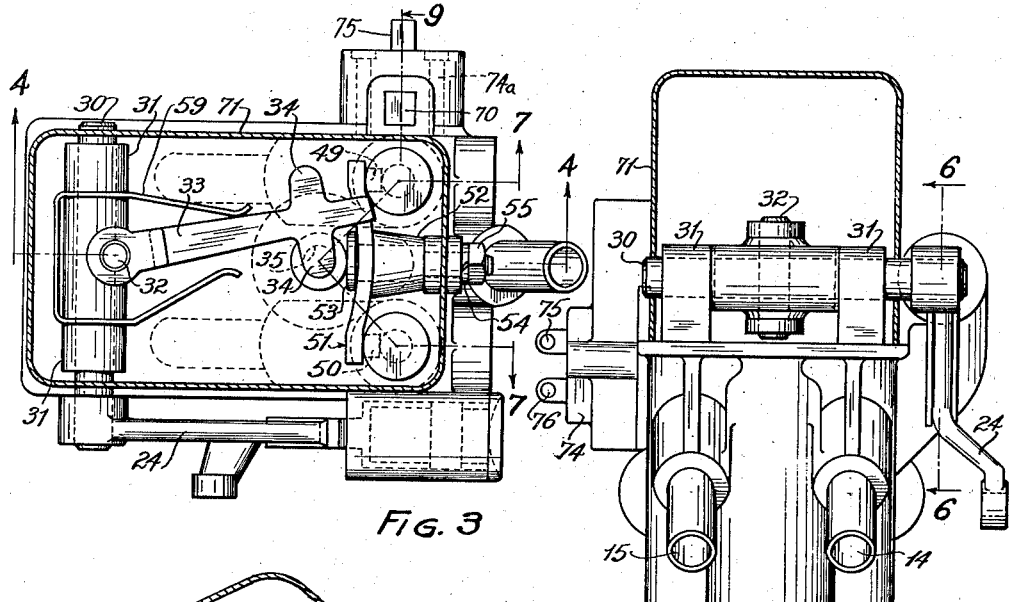
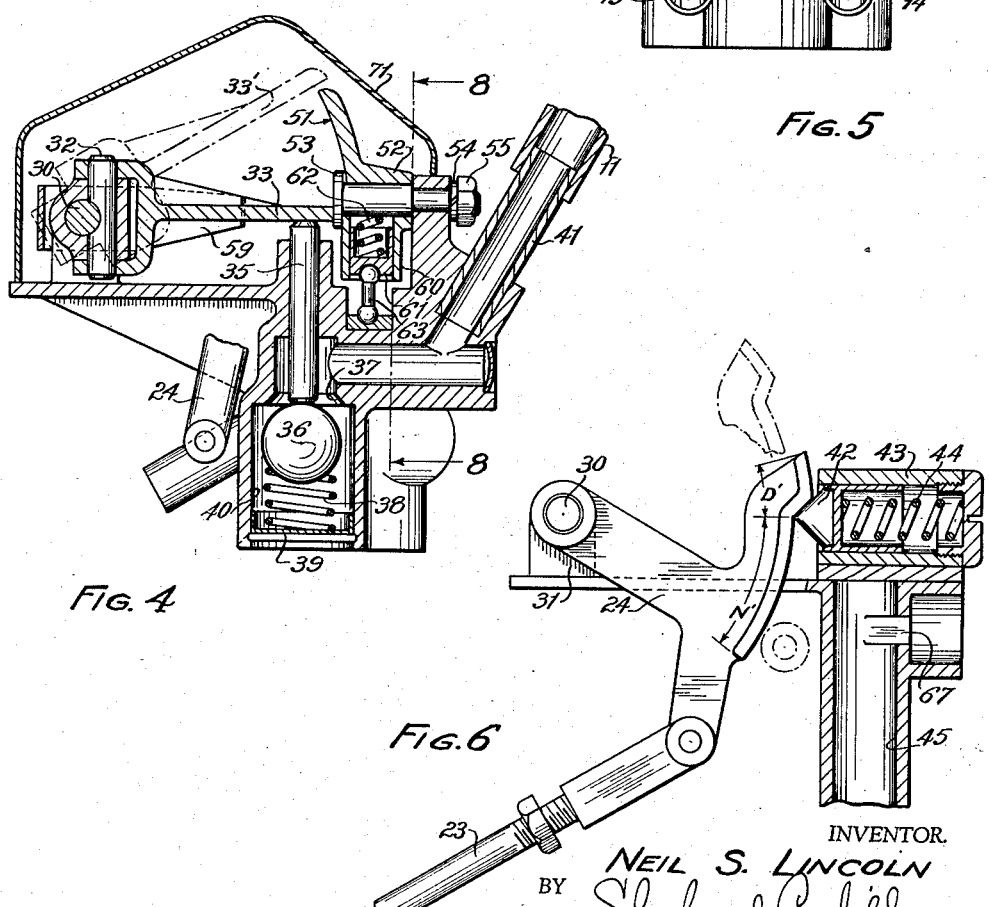

INVENTOR.
Neil S. Lincoln
BY
His ATTORNEYs

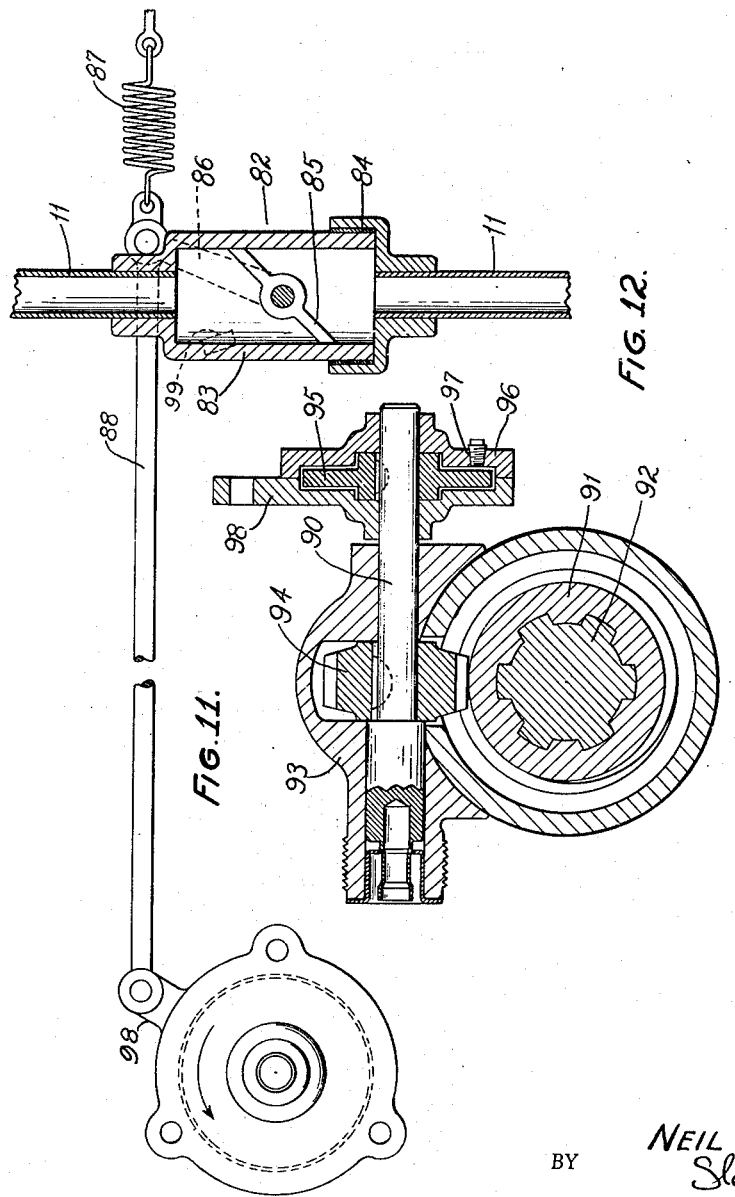

Patented Jan. 10, 1939

2,143,446

UNITED STATES PATENT OFFICE 2,143,446

CONTROLLING MECHANISM FOR AUTOMOBILE TRANSMISSIONS

Neil S. Lincoln, Detroit, Mich., assignor to The Columbia Axle Company, Cleveland, Ohio, a corporation of Ohio Application February 23, 1937, Serial No. 127,188

7 Claims. (Cl. 74—474)

This invention relates to controlling mechanism for automobile transmissions, and more particularly to an improved control mechanism for vacuum actuated shifting means for automotive multi-speed transmissions.

Heretofore, automotive vehicles have been provided with a multi-speed arrangement in association with the rear axle and in addition to the regular transmission whereby the ratio of axle speed to engine speed may be altered after the vehicle has acquired a desired speed. The rear axle speed has usually been limited to two-speeds relative to the drive shaft speed and the change from one speed to the other has been effected through suitable gearing and/or clutch arrangements. The shifting of the gears and/or clutches has been effected either manually through suitable link means or by utilizing the engine vacuum under a manual control.

A two-speed axle drive transmission utilizing the engine vacuum under manual control is illustrated in U. S. Patent No. 2,071,165, issued February 16, 1937 to George W. Harper and Alfred R. Catto, entitled "Axle drive transmission." Transmissions of the type illustrated in the aforementioned application have a manual control lever located on or adjacent the vehicle dashboard for shifting from one axle speed to another but this necessitates employing one hand for this purpose leaving only one hand for guiding the vehicle or preventing the use of this hand for operating the brake or for similar purposes. It is highly desirable that both hands be left free for the normal operation of a vehicle employing a two-speed axle drive transmission and to this end, I have devised an improved control mechanism for vacuum operated transmissions of this type whereby a supplemental clutch movement controls the operation of a vacuum system and eliminates the necessity of employing either hand for this purpose.

It is an object of my invention therefore to provide an improved control mechanism for fluid operated multi-speed axle drive transmissions.

Another object of my invention is to provide an improved control mechanism for fluid operated multi-speed axle drive transmissions which requires only a supplemental clutch movement and eliminates the necessity for additional control levers mounted on the vehicle dashboard.

Another object of my invention is to provide an improved arrangement operable by pedal movement for controlling mechanisms actuated by the vacuum system of an internal combustion engine.

Another object of my invention is to provide a signal means for multi-speed axle drive transmissions indicating a particular ratio of axle speed to drive shaft speed.

Another object of my invention is to provide a multi-speed axle mechanism for automotive vehicles having means associated therewith adapting the speedometer for the vehicle to read correctly according to the axle speed.

Another object of my invention is to provide a control mechanism for fluid operated multi-speed axle drive transmissions including means rendering the control mechanism inoperable to effect speed change below a pre-determined drive shaft speed.

Other objects of my invention and the invention itself will become increasingly apparent from a consideration of the following description and drawings wherein:

Fig. 1 is a diagrammatic view of an automotive vehicle embodying my invention;

Fig. 2 is an enlarged section taken along line 2—2 of Fig. 1;

Fig. 3 is a top plan view of a distributing valve which I employ with a cover portion shown in section;

Fig. 4 is a section along line 4—4 of Fig. 3;

Fig. 5 is a left end elevational view of the valve of Fig. 4 with the cover portion shown in section;

Fig. 6 is a fragmentary sectional view taken along line 6—6 of Fig. 5;

Fig. 11 is a fragmentary elevational view, partially in section of a governor control mechanism which I may employ, and Fig. 12 is transverse sectional view through a drive shaft showing a portion of the mechanism of Fig. 11.

Figure 7:
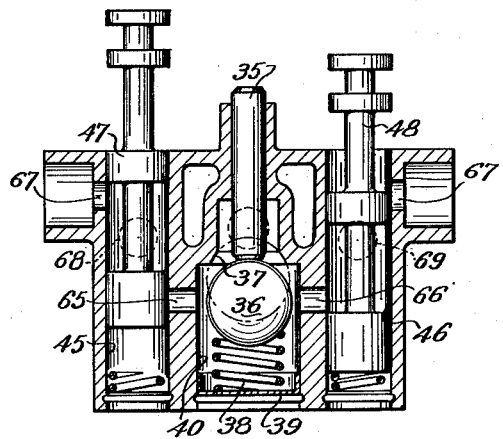
Fig. 7 is a revolved sectional view taken along planes 7—7 of Fig. 3.

Referring now to the drawings, I have illustrated generally at 10 the intake manifold of an internal combustion engine of a vehicle and which in a well known manner will intermittently create a vacuum or suction in any conduit connected therewith due to displacement of air in a cylinder by the upward movement of the piston and the reverse piston movement creating a substantial vacuum within the cylinder. Connected with the intake manifold 10 is a copper or the like vacuum tube 11, the connection being preferably made by a flexible coupling connecting the end of tube 11 with a lateral outlet from the intake manifold. This type of connection eliminates any tendency toward breakage due to vibration.

The vacuum tube 11 connects with a distributing valve generally indicated at 12 and which will be hereinafter described. The distributing valve 12 may be conveniently mounted inside the engine compartment by securing the valve to a bracket indicated at 13. Leading from the distributing valve 12 are two vacuum lines 14 and 15 preferably formed of copper, the lines 14 and 15 passing beneath the floor of the vehicle and connecting with a vacuum cylinder 16 adjacent the rear axle. The connections for the vacuum lines throughout preferably comprise flexible tubing to eliminate any tendency toward breakage and I preferably provide a considerable length of flexible tubing for lines 14 and 15 adjacent cylinder 16, as indicated at 17.

The rear axle, generally indicated at 18, is of the two speed type and the change from one axle speed to another is effected through the vacuum cylinder 16. A preferred form of rear axle two-speed construction of this type being illustrated and described in the aforesaid Patent No. 2,071,165 issued February 16, 1937, entitled "Axle drive transmissions". The operation is effected by creating a substantial vacuum on one side of a piston within cylinder 16 while subjecting the opposite side to atmospheric pressure thereby forcing the piston in a given direction to alter the gearing arrangement of the rear axle relative to the drive shaft. The reverse operation is effected to change the speed, that is the vacuum line is connected with the side of the piston which previously was subjected to atmospheric pressure and atmospheric pressure is admitted to the former vacuum side of the piston. Although the piston is operated by a vacuum line arrangement it is apparent that the pressure differential at opposite ends of the piston effecting piston movement could be provided by compressed air or fluid pressure.

The distributing valve 12 is adapted to control the air and suction in the two lines 14 and 15 which lead to opposite sides of the piston, and the valve operation is controlled by a supplemental motion of the ordinary vehicle clutch pedal. The clutch pedal is generally indicated at 20 and is pivoted in the usual manner, as indicated at 21, with the pedal portion extending through the floor board and accessible in the usual manner to pedal movement of the operator. The normal clutch movement adapted to disconnect the drive shaft with the engine is indicated by N and an additional movement indicated at D is adapted to control operation of the distributing valve. The clutch is provided with a generally depending arm 22 of relatively short length to which is secured a link rod 23, the opposite end of the link rod engaging an element 24 pivotally supported by the distributing valve as indicated at 25. During normal movement of the clutch pedal corresponding to N, the cam surface of element 24 indicated at N' moves about an axis 25 as a center and has no effect on the operation of the distributing valve. However, when the clutch pedal moves through D, the valve 12 is operated in a manner to be described.

The operation of the distributing valve 12 which is best illustrated in Fig. 4, will now be described. The element 24 actuated by the clutch pedal, as previously described, is integrally locked with a shaft 30 rotatably mounted in spaced bearings 31—31 formed on the distributing valve 12. Integral with shaft 30, is a generally vertically extending pin 32 to which is pivotally secured the yoke portion of an arm 33 whereby the arm 33 will be oscillated vertically as the shaft 30 is actuated and will also be permitted to move horizontally about pin 32 as a center, thereby effecting a universal movement.

Arm 33 in Fig. 4 is shown in elevated position as indicated at 33' or the position it will occupy during normal clutch operation. The full line position indicates the location of arm 33 when the clutch pedal has been forced downward and stopped by engagement with the vehicle floor.

In the full line position, either of two lateral ears 34—34 provided on arm 33 engage a slideable pin 35 to force it vertically downwardly and thereby force a ball valve 36 from engagement with a generally frusto-conical valve seat 37. The downward movement of ball 36 is resisted by a spring 38 which seats upon a cup-shaped washer 39 which is in air-tight engagement with the walls of a chamber 40 within which the ball valve is disposed.

An upwardly extending stem 41 connecting with chamber 40 is a continuation of conduit 11 whereby suction created in the motor intake manifold will effect a substantial vacuum in chamber 40 assuming ball valve 36 is in open position. The suction effect on chamber 40 will only continue during the time the ball valve 36 is held in open position or during the relatively short period when the clutch pedal is held against the floor board thereby only placing an additional suction load on the engine for the short interval necessary to effect movement of the piston at the rear axle.

In order to prevent the clutch pedal from effecting a speed change at the rear axle during normal operation thereof, a stop means or detent is provided which will now be described. Referring particularly to Fig. 6, it will be noted that element 24 is provided with a camming portion D' which is adapted to engage the V-shaped portion of a detent 42 slideably mounted in a sleeve 43 formed integral with the distributing valve housing. A relatively stiff compression spring 44 constantly urges the detent in a direction to engage element 24 whereby the operator is instantly aware of the termination of normal clutch movement when pressing the clutch pedal toward the floor due to the resistance to further downward movement caused by the detent 42 engaging the portion D' of element 24.

Figure 8:
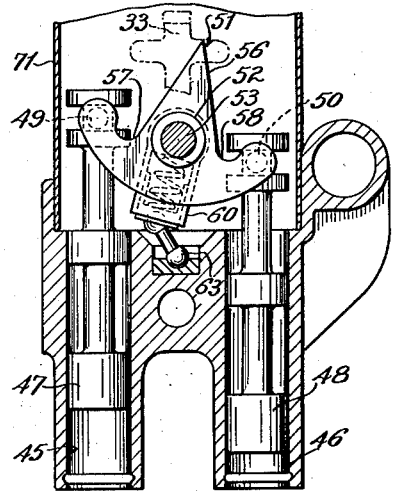
Fig. 8 is a vertical sectional view taken along line 8—8 of Fig. 4.

The manner of utilizing the vacuum formed in chamber 40 to effect movement of the actuating piston in vacuum cylinder 16 associated with the rear axle will now be described. Referring particularly to Figures 3, 4 and 8, it will be noted that the distributor valve housing is vertically bored to provide parallel cylinders indicated at 45 and 46 within which are disposed piston valves 47 and 48 respectively. These piston valves are actuated by movement of arm 33 in a downward direction concurrently with opening of ball valve 36 to apply suction to chamber 40. The upper end of piston valves 47 and 48 are provided with external annular grooves which receive pins 49 and 50 secured to lateral extensions of a cam element 51. The cam element 51 comprises a hub portion 52 through which is projected a headed bolt 53 which also projects through a perforation provided therefor in the valve housing, the bolt being secured in any suitable manner as by a lock washer 54 and nut 55. Cam element 51 is rotatable relative to bolt 53 and is thus adapted to oscillate laterally about an axis extending longitudinally of the distributing valve. An upwardly extending camming surface 56 of cam element 51 is of inverted V-form terminating in pockets 57 and 58. During normal operation of the clutch pedal the arm 33 will be elevated in some position such as indicated at 33', Fig. 4, and will be maintained substantially centrally of the distributing valve by means of a U-form leaf spring 59 having end portions adapted to force arm 33 toward a central position when elevated out of contact with cam element 51.

Referring now to Figs. 4 and 8 wherein arm 33 is shown at an elevated position as indicated at 33', it will be apparent that as the clutch pedal is forced downwardly that the arm 33 will correspondingly be forced downwardly to ride along the left hand camming surface 56 and eventually engage pocket 57 and thereby tilt cam element 51 in a counter-clockwise direction forcing piston valve 47 downwardly, and piston valve 48 upwardly. An eccentric arrangement aids in this movement after the apex of the camming portion 56 has passed the vertical center and maintains the cam element 51 in the oscillated position upon raising of lever 33 due to normal functioning of the clutch pedal. This eccentric arrangement comprises a depending sleeve 60 provided on cam element 51 within which is slideably disposed a cup shaped member 61 engaging a compressed spring 62. The base of member 61 has a semi-spherical depression formed therein to engage the spherical end of a pin 63, the opposite end of pin 63 being similarly mounted in a semi-spherical pocket formed in a portion of the distributor valve housing. It will now be understood that upon the cam element 51 being forced on either side of a median position through engagement with arm 33, that a snap action effect will occur and maintain one of the piston valves in an elevated position and the other valve in a lowered position. During normal operation of the clutch pedal or when the clutch pedal is moving through the distance N, as illustrated in Fig. 1, the shaft 30 and arm 33 will be rocked but the travel of the arm 33 downwardly is not sufficient to engage the pockets 57 or 58 of cam 51 to rock the cam to a reverse position. It will be understood that after the cam has been tilted to the position illustrated in Fig. 8 through engagement of arm 33 with pocket 58 of the cam, that the arm 33 will be lifted above and clear of cam 51 when the clutch pedal is released to engage the clutch. One of the spring arms 59 is always in engagement with arm 33 tending to return the arm to a central position and this occurs as soon as the arm is lifted to a position above cam 51, thereby placing the arm in position to engage cam pocket 57 when next the clutch pedal is pressed inwardly beyond the distance N.

Fig. 7 is a section taken along planes 7—7 of Fig. 3 and revolved into a common plane and it will be noted that a diagonally disposed port 65 affords communication between chamber 40 and cylinder 45 and a similar port 66 affords communication between chamber 40 and cylinder 46. Adjacent the top of cylinders 45 and 46 are ports 67—67 communicating with the atmosphere whereby atmospheric pressure may be admitted to the cylinders.

Ports indicated at 68 and 69 formed in cylinders 45 and 46 respectively communicate with vacuum lines 14 and 15 leading to the vacuum cylinder 16 whereby in a manner to be now described suction may be applied to one side of the piston within the vacuum cylinder and atmospheric pressure concurrently applied to the opposite side of the piston thereby effecting piston movement and resultantly, speed change.

Referring now to Fig. 7, it will be noted that piston valve 47 is in raised position and covers port 65 thereby eliminating any suction effect from chamber 40 and at the same time port 67 is uncovered permitting atmospheric pressure within the cylinder which, in turn, is communicated to line 14 through port 68 and resultantly to one side of the piston. At the same time, piston valve 46 in its lowered position uncovers port 66 and thereby subjects the cylinder 48 to suction and through port 69 this suction is communicated to line 15 and then to the opposite side of the piston while at the same time atmospheric pressure is prevented from communicating with port 69. Thus, it will be understood that downward movement of the clutch pedal beyond a predetermined normal operating position will actuate cam element 51 through arm 33 and resultantly communicate vacuum to one side of the actuating piston and atmospheric pressure to the opposite side to effect piston movement. Upon the release of the clutch pedal from the extreme downward position to normal operating position, ball valve 36 will be sealed with its seat 37 eliminating any further suction drag on the engine, but the cam element 51 and its associated piston valve will remain in operated position.

When it is desired to again change the rear axle speed relative to drive speed, the clutch pedal is pushed downwardly beyond a normal clutch dis-engaging position which will be evidenced by the detent 42 resisting movement beyond the normal disengagement position and this additional movement rocks shaft 30 and arm 33 which has been extended above cam element 51 downwardly a sufficient amount to engage the right hand camming surface 56 as viewed in Fig. 8 and eventually pocket 58 to effect a snap action movement. This lowers piston valve 47 and raises piston valve 48 thereby in a similar manner communicating atmospheric pressure to the piston face which previously has been subjected to vacuum and applying suction to the piston face which previously has been subjected to atmospheric pressure resultantly moving the piston in a reverse direction to effect the speed change.

The spring controlled detent 42 is provided merely to offer sufficient resistance to inward movement of the clutch pedal to indicate to the vehicle operator that the clutch pedal is moving through the cam operating range. Thus, there is no danger of the operator pressing the clutch pedal downwardly sufficiently far to effect speed change without being aware of this fact.

Figure 9:
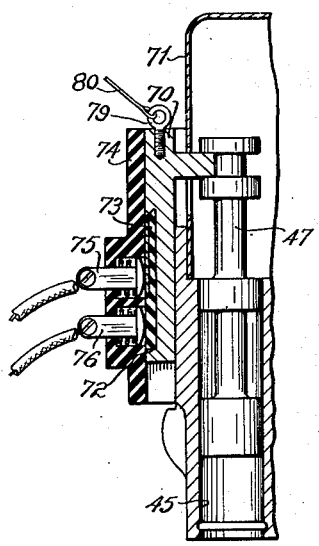
Fig. 9 is a fragmentary sectional view showing an electrical contact mechanism I may employ.
Figure 10:
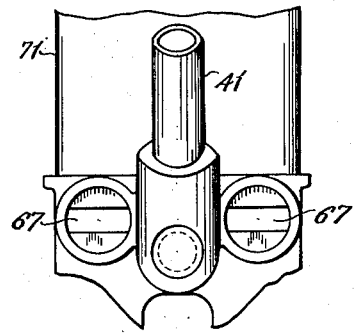
Fig. 10 is a fragmentary right hand elevational view of the valve illustrated in Fig. 4.

It is desirable that some signalling means be provided to indicate at which of two speeds the rear axle is functioning and this is effected in the following manner as best indicated in Figs. 3, 5 and 9. A bar 70 generally square in cross-section is maintained in sliding engagement with an external wall of the distributor valve housing and is provided with a laterally extending lug projected through a slot in a cover 71 to engage the upper annular groove of piston valve 47 whereby bar 70 will be vertically moved in correspondence with movement of valve 47. Bar 70 is recessed to receive electrical insulating material 72 within which is seated a contact strip 73. A generally U form housing element 74 formed of suitable electrical insulating material encases bar 70, the element being widened laterally whereby screws 74A may be projected therethrough and engage the distributor valve housing to secure element 74 thereto. Element 74 is also relatively thickened to provide spaced recesses within which are disposed headed contacts 75 and 76 resiliently maintained in contact with bar 70. Bridging of contacts 75 and 76 by contact strip 73 energizes a circuit including wires 77 and a signal light 78 mounted on the dashboard. Thus, when the circuit is energized and indication is given that a particular one of the two speeds is being used in operating the vehicle.

Secured to the top of bar 70 is an eye bolt 79 to which a wire 80 may be secured and the opposite wire end may be secured to the adapter of the vehicle speedometer. The usual speedometer is operated in correspondence with drive shaft speed but to give a proper indication of vehicle speed when the rear axle speed is altered compared to drive shaft speed as in the present instance an adapter is provided on the speedometer. Speedometers of this type are well known and I contemplate that the wire 80 may operate the adapter to change the speed indication when the piston valve 47 is forced downwardly.

It is desirable that positive engagement of clutch elements associated with the drive shaft and rear axle when changing speeds be delayed until the speeds of the rear axle and drive shaft be synchronized and a means of effecting this result is described in the forementioned Patent 2,071,165. Otherwise, serious damage might result to the mechanism parts. With the present arrangement it is desired to prevent attempted speed change when the vehicle is not moving but with the engine idling sufficiently to create vacuum in the cylinder 16 or until the vehicle has attained a pre-determined speed. To prevent operation of the speed change mechanism under these conditions I provide a governor control arrangement best illustrated in Figs. 1, 11 and 12.

A valve mechanism 82 is inserted in the vacuum line 11 which connects the intake manifold 10 with the distributor valve 12. The mechanism 82 comprises a two part housing 83, each part including a neck portion adapted to sealingly engage confronting end portions of line 11, and the parts then being relatively telescoped and sealed by suitable material 84. A butterfly type valve 85 is mounted within housing 83 and is rotatable on trunnions having bearing in the housing walls, one of the trunnions being projected through the wall and fixedly secured to an arm 86 disposed internally of the housing. The outer end of arm 86 has a tension spring 87 secured thereto continuously urging valve 85 in a closing direction. Also secured to the outer end of arm 86 is one end of a link element 88 which is illustrated in Fig. 1 as a wire rope and in Fig. 11 as a rod but any suitable link arrangement may be used. The opposite end of element 88 is secured to a governor mechanism 89.

The governor mechanism 89 is illustrated as being operable from a shaft 90 associated with a conventional speedometer actuating mechanism. The conventional speedometer actuating mechanism usually comprises a worm 91 keyed to the splined portion of the vehicle drive shaft 92 adjacent the transmission. The drive shaft housing has mounted thereon an auxiliary housing 93 forming bearing support for shaft 90 and encasing a gear 94 meshed with worm 91 and keyed to shaft 90. The speedometer actuating mechanism so far described is of a standard construction and constitutes no essential part of my invention. I extend shaft 90 externally of housing 93 and key a disc 95 thereto and enclose the disc 95 in a two-part housing 96 whose inner walls are slightly spaced from the disc. Heavy oil or similar fluid is forced within the housing 96 through an opening 97 which is then plugged. Housing 96 is provided with an arm 98 to the outer end of which is secured the link element 88.

The operation of the governor mechanism will now be described. When the drive shaft 92 is at rest, spring 87 will maintain valve 85 closed and if the vehicle operator should press the clutch downwardly beyond the normal operating position ball valve 36 of distributor valve 12 would be forced from its seat 37 but since the vacuum line 11 is closed no movement of the piston within cylinder 16 would result. When the drive shaft starts to rotate the frictional drag of disc 96 causes arm 98 to move in a counter-clockwise direction as viewed in Fig. 11 and operate the link element 88 against the tension of spring 87 to open valve 85. I provide a stop 99 engageable by arm 86 to limit movement after the valve is opened a maximum amount, and housing 96 will be restrained from further movement. Thus, at any time after the car is in motion the speed change may be effected as described.

Although for illustration I have shown the above described governor arrangement, I contemplate that any suitable governor operable at a predetermined speed of the vehicle to open valve 85 may be employed. Governors of this general type are well known in the art.

Although I have shown and described a preferred embodiment of my invention I contemplate that numerous and extensive departures may be made therefrom without departing from the spirit of my invention and the scope of the appended claims.

Having thus described my invention what I claim is:

1. In a vehicle driven by an internal combustion engine of the type having a multi-speed rear axle and including a vacuum cylinder and piston effecting speed change, a valve mechanism controlling piston movement comprising a conduit connection with the engine intake manifold, means normally checking suction from the engine to the valve mechanism, a pair of conduits connecting the valve mechanism with the cylinder at opposite ends of the piston, valve means associated with said mechanism adapted to concurrently admit air to one of said conduits and apply suction to the other to effect piston movement, pedal means for operating the valve means to successively move the piston in reverse directions, and movement of the pedal means to operate the valve rendering the check means inoperative.

2. In a vehicle having a motor adapted to create suction in an intake manifold and having pedal means disconnecting the engine and drive shaft, the vehicle having a multi-speed rear axle including a vacuum cylinder and piston for effecting speed change, a valve mechanism including a connection with the engine intake manifold, means normally checking suction from the engine intake manifold to the valve mechanism, a pair of conduits connecting the valve mechanism with the vacuum cylinder at opposite ends of the piston, valves adapted to concurrently and selectively admit air to one of said conduits and apply suction to the other from the engine intake manifold, the valves being operable by the pedal means through supplemental movement beyond normal movement disconnecting the engine and drive shaft, and means connecting the pedal means and check means operable on movement of the pedal means to a valve operating position to render the check means inoperable.

3. The combination with an automotive vehicle having a multi-speed rear axle, speed change means operable by fluid pressure, a clutch pedal movable to disconnect the vehicle engine and drive shaft, means for providing differential fluid pressure, a valve mechanism operable to control the application of differential fluid pressure to the speed change means for effecting speed change, said valve mechanism comprising a low pressure fluid chamber, a pair of slide valves each operable within an individual chamber in the valve mechanism, a pair of conduits communicating with the speed change means and valve chamber ports connecting the low pressure chamber with each valve chamber, ports connecting each valve chamber with a source of relatively higher fluid pressure, and means for concurrently operating the valves by continued clutch pedal movement in a given direction after the engine and drive shaft are disconnected to cause the port of one valve chamber from the low pressure chamber to be closed and a high pressure port to be opened and the port from the low pressure chamber to the second valve chamber to be opened and the high pressure port to be closed.

4. The combination with an automotive vehicle having a multi-speed rear axle, speed change means operable by fluid pressure, clutch pedal movable to disconnect the vehicle engine drive shaft, means operable by the engine for effecting sub-atmospheric pressure, a valve mechanism operable to control the application of differential fluid pressure to the speed change means for effecting speed change, said valve mechanism comprising a chamber communicating with the engine for effecting sub-atmospheric pressure therein, a pair of valve chambers each in communication with said chamber, each of said valve chambers being vented to atmosphere, conduits connecting each of said valve chambers with the speed change means, slide valves in each of said chambers for selectively closing the atmospheric vent and communicating with the low pressure chamber, means interconnecting the valves for concurrently operating the valves to apply atmospheric pressure to one conduit and sub-atmospheric pressure to the other conduit, means operable by clutch pedal movement beyond a normal position disconnecting the vehicle engine and drive shaft for actuating the interconnecting means, valve means normally closing communication between the low pressure chamber and engine, means operable by the clutch pedal at a position beyond said normal disconnecting position for operating the valve means to open communication between the low pressure chamber and engine.

5. The combination with a speed control mechanism for motor vehicles and the like comprising a differential having variable speed gears, and a control unit for said gears operable by differential fluid pressure, of means for actuating said unit comprising a valve mechanism having a pressure chamber, a pair of valves operable to concurrently supply relatively low and high pressure fluid to the control unit, communicating means between each of said valves and the pressure chamber, communicating means between each of said valves and a source of substantially constant fluid pressure, valve means for the chamber operable to effect a fluid pressure in the chamber different from said substantially constant pressure, and means operable by the vehicle operator for concurrently operating the chamber valve means, and the pair of valves to supply a differential fluid pressure to the control unit.

6. The combination with a speed control mechanism for motor vehicles and the like having variable speed gears, and a control unit for said gears operable by differential fluid pressure, of means for actuating said unit comprising a valve mechanism having a low pressure chamber, a pair of valves operable to concurrently supply high and low pressure to the control unit, communicating means between each of said valves and the low pressure chamber, communicating means from each of said valves to a source of relatively higher fluid pressure, a conduit communicating with the vehicle engine and low pressure chamber for effecting relatively low pressure in the chamber, a first valve means for said conduit closing the conduit until a predetermined vehicle speed is attained, a second valve means associated with the valve mechanism and normally closing the conduit, and means operable by the vehicle operator for concurrently operating the second valve means and actuating said pair of valves to transmit low pressure fluid from the low pressure chamber and high pressure fluid from the high pressure source to the control unit when the vehicle is operated above said pre-determined speed.

7. In a vehicle having an internal combustion engine including an intake manifold and a clutch pedal movable to disconnect the motor and drive shaft, the vehicle including a multi-speed rear axle and a piston movable within a cylinder to effect speed change, a valve mechanism comprising a chamber connected with the engine intake manifold, means for normally checking suction to the chamber from the intake manifold, means operable by the clutch pedal on continued movement after clutch dis-engagement to render the check means inoperable, a pair of conduits connecting the valve mechanism with the cylinder at opposite sides of the piston, valve means associated with the conduits adapted to concurrently admit atmospheric pressure to one conduit and apply suction from the chamber to the other conduit, means linking the clutch pedal with the valve means whereby clutch pedal movement beyond a normal position disconnecting the engine and drive shaft will concurrently render the check means inoperable and thereby applying suction to the chamber and actuate the valve means to apply suction to one side of the piston and atmospheric pressure to the opposite side effecting piston movement and resultantly speed change at the rear axle, and means providing for maintaining the valve means in actuated position upon reverse movement of the clutch pedal effecting connection of the drive shaft with the engine.

NEIL S. LINCOLN.